United States Patent
Spangler

(10) Patent No.: US 7,930,282 B2
(45) Date of Patent: Apr. 19, 2011

(54) DOCUMENT CLUSTERING BASED ON COHESIVE TERMS

(75) Inventor: William S. Spangler, San Martin, CA (US)

(73) Assignee: International Business Machines Corporation, Armonk, NY (US)

( * ) Notice: Subject to any disclaimer, the term of this patent is extended or adjusted under 35 U.S.C. 154(b) by 432 days.

(21) Appl. No.: 12/058,295

(22) Filed: Mar. 28, 2008

(65) Prior Publication Data

US 2008/0177736 A1 Jul. 24, 2008

Related U.S. Application Data

(63) Continuation of application No. 11/555,291, filed on Nov. 1, 2006, now Pat. No. 7,512,605.

(51) Int. Cl.
*G06F 7/00* (2006.01)
(52) U.S. Cl. .................. 707/705; 707/752; 707/765
(58) Field of Classification Search .................. None
See application file for complete search history.

(56) References Cited

U.S. PATENT DOCUMENTS

| | | | | |
|---|---|---|---|---|
| 6,424,971 | B1 * | 7/2002 | Kreulen et al. | 707/737 |
| 6,804,670 | B2 | 10/2004 | Kreulen et al. | |
| 6,986,104 | B2 | 1/2006 | Green et al. | |
| 2002/0169783 | A1 * | 11/2002 | Kreulen et al. | 707/102 |
| 2005/0022106 | A1 | 1/2005 | Kawai et al. | |

FOREIGN PATENT DOCUMENTS

JP 2004288168 A 10/2004

OTHER PUBLICATIONS

Berry, J. and Linoff, A; "Data Mining Techniques for Marketing, Sales, and Customer Support." John Wiley & Sons, Inc., New York, 1996, pp. 187-215.
Fox, C.; "Lexical Analysis and Stoplists." 1992, pp. 102-130.
Honrado, A.; Leon, R.; O'Donnel, R.; and Sinclair, D.; "A Word Stemming Algorithm for the Spanish Language." Seventh International Symposium on String Processing Information Retrieval; SPIRE 2000; pp. 139-145.
Salton, G. and Buckley, C.; "Term-Weighting Approaches in Automatic Text Retrieval." Information Processing & Management, vol. 24, No. 5, 1988, pp. 513-523.
Salton, G. and McGill, M. J.; "Introduction to Modern Retrieval." McGraw-Hill Book Company, New York, 1983. pp. 52-73.

(Continued)

*Primary Examiner* — Debbie Le
*Assistant Examiner* — Hasanul Mobin
(74) *Attorney, Agent, or Firm* — Cantor Colburn LLP

(57) ABSTRACT

A method and a storage medium, that includes instructions for causing a computer to implement the method, for document categorization is presented. The method includes identifying terms occurring in a collection of documents, and determining a cohesion score for each of the terms. The cohesion score is a function of a cosine difference between each of the documents containing the term and a centroid of all the documents containing the term. The method further includes sorting the terms based on the cohesion scores. The method also includes creating categories based on the cohesion scores of the terms, wherein each of the categories includes only documents (i) containing a selected one of the terms and (ii) that have not already been assigned to a category. The method still further includes moving each of the documents to a category of a nearest centroid, thereby refining the categories.

6 Claims, 3 Drawing Sheets

OTHER PUBLICATIONS

Spangler, S. and Kreulen, J.; "Interactive Methods for Taxonomy Editing and Validation." Proceedings of the Conference on Information and Knowledge Mining; CIKM 2002; 8 pages.

Spangler, S.; Kreulen, J.; and Lessler, J.; "Generating and Browsing Multiple Taxonomies Over a Documents Collection." Journal of Management Information Systems, vol. 19, No. 4, Spring 2003, pp. 191-212.

Can, F. and Ozkarahan, E. A.; "Concepts of the Cover Coefficient-Based Clustering Methodology." 1985, pp. 204-211.

Harabagiu, S. and Lacatusu, F.; "Topic Themes for Multi-Document Summarization." SIGIR'05, Aug. 15-19, 2005, pp. 202-209.

Hardy, H., et al. "Cross-Document Summarization by Concept Classification." SIGIR '02, Aug. 11-15, 2002, pp. 121-128.

* cited by examiner

US 7,930,282 B2

DOCUMENT CLUSTERING BASED ON COHESIVE TERMS

CROSS REFERENCE TO RELATED APPLICATION

This application is a continuation of U.S. patent application Ser. No. 11/555,291 entitled "DOCUMENT CLUSTERING BASED ON COHESIVE TERMS" filed Nov. 1, 2006 which is incorporated herein by reference in its entirety

TRADEMARKS

IBM® is a registered trademark of International Business Machines Corporation, Armonk, N.Y., U.S.A. Other names used herein may be registered trademarks, trademarks or product names of International Business Machines Corporation or other companies.

BACKGROUND OF THE INVENTION

1. Field of the Invention

This invention relates to document clustering, and particularly to document clustering based on cohesion terms.

2. Description of Background

Before our invention, businesses have systematically increased the leverage gained from enterprise data through technologies such as relational database management systems and techniques such as data warehousing. Additionally, it is conjectured that the amount of knowledge encoded in electronic text far surpasses that available in data alone. However, the ability to take advantage of this wealth of knowledge is just beginning to meet the challenge. One important step in achieving this potential has been to structure the inherently unstructured information in meaningful ways. A well-established first step in gaining understanding is to segment examples into meaningful categories.

Previous attempts to automatically create categorizations in unstructured data have relied on algorithms created for structured data sets. Such approaches convert text examples into numeric vectors of features, sometimes using latent semantic indexing and principle component analysis to reduce dimensionality, and then cluster the data using well-established clustering techniques such as k-means or Expectation Maximization (EM). These approaches attempt to maximize intra-cluster similarity while minimizing inter-cluster similarity.

The problem with approaches of this kind is that they often produce categories that are inexplicable to human interpretation. The fact that a group of documents shares a degree of similarity across an artificial feature space does not insure that the documents in that category taken together construct an easily understood concept. This has led to the problem of cluster naming, to which no practical solution has been found.

SUMMARY OF THE INVENTION

The shortcomings of the prior art are overcome and additional advantages are provided through the provision of a method (and storage medium that includes instructions for causing a computer to implement the method) for document categorization. The method includes identifying terms occurring in a collection of documents, and determining a cohesion score for each of the terms. The cohesion score is a function of a cosine difference between each of the documents containing the term and a centroid of all the documents containing the term. The method further includes sorting the terms based on the cohesion scores. The method also includes creating categories based on the cohesion scores of the terms, wherein each of the categories includes only documents (i) containing a selected one of the terms and (ii) that have not already been assigned to a category. The method still further includes moving each of the documents to a category of a nearest centroid, thereby refining the categories.

System and computer program products corresponding to the above-summarized methods are also described and claimed herein.

Additional features and advantages are realized through the techniques of the present invention. Other embodiments and aspects of the invention are described in detail herein and are considered a part of the claimed invention. For a better understanding of the invention with advantages and features, refer to the description and to the drawings.

As a result of the summarized invention, technically we have achieved a solution where the creation of taxonomies from cohesion terms is easier for a user to interpret than standard statistical approaches. By creating categories that can be described succinctly with a single word or phrase, the prior cluster-naming problem that plagues most other approaches is avoided. This provides an important practical method for quickly understanding the content of a large number of short text documents in any domain.

BRIEF DESCRIPTION OF THE DRAWINGS

The subject matter, which is regarded as the invention, is particularly pointed out and distinctly claimed in the claims at the conclusion of the specification. The foregoing and other objects, features, and advantages of the invention are apparent from the following detailed description taken in conjunction with the accompanying drawings in which:

The detailed description explains the preferred embodiments of the invention, together with advantages and features, by way of example with reference to the drawings.

DETAILED DESCRIPTION OF THE INVENTION

Figure 1:
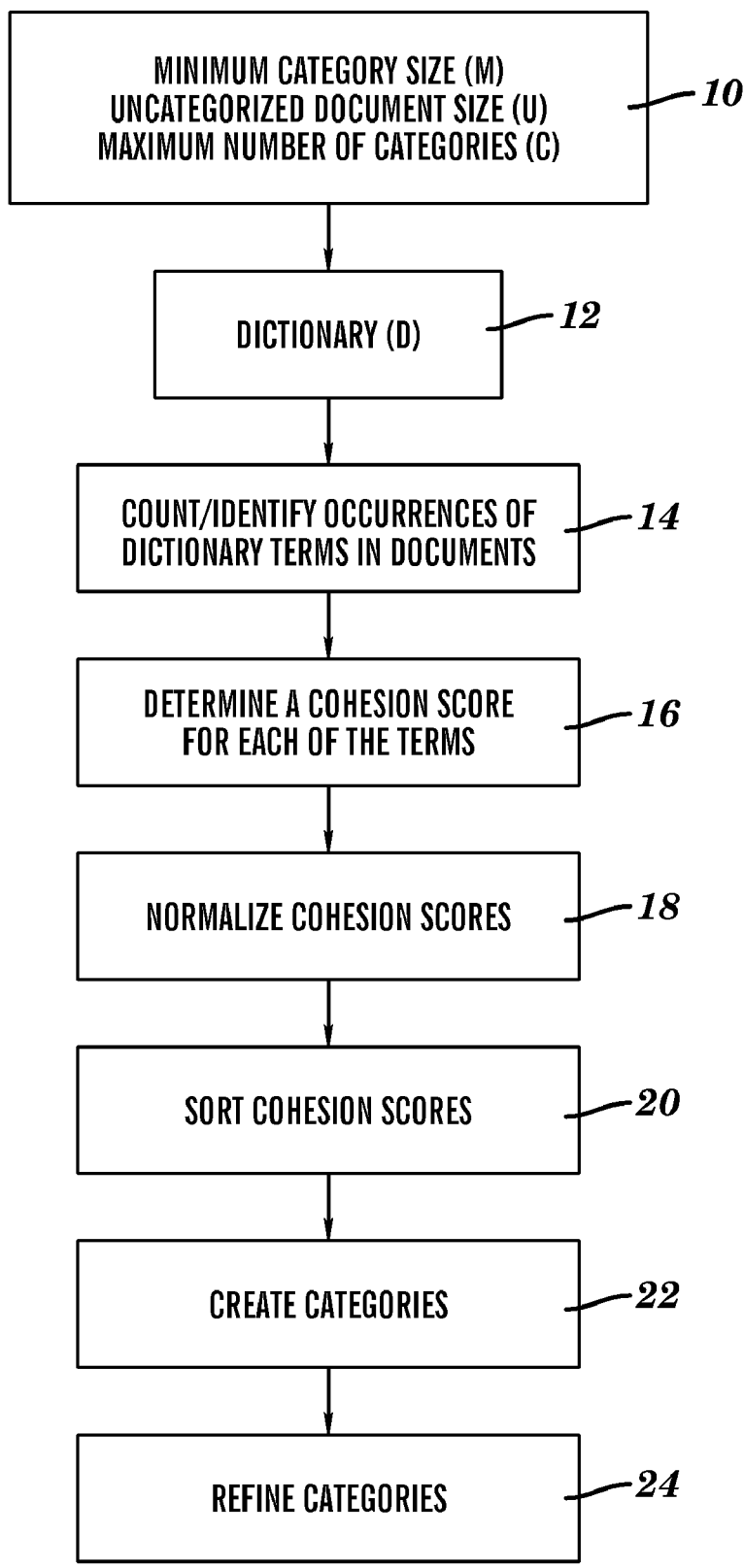
FIG. 1 illustrates one example of a flow chart for a cohesion term taxonomy.

Turning now to the drawings in greater detail, it will be seen that in FIG. 1 there is flow chart illustrating a cohesion term taxonomy, which is applicable to any situation where it is desirable to create a taxonomy across a set of distinct documents. At a block 10, a minimum category size (M), an uncategorized document size (U), and maximum number of categories (C) is given. At a block 12, a dictionary (D) of frequently used words/phrases (terms) in a text data set (T) is identified. At a block 14, the occurrences of dictionary terms in documents of data set T are counted. At a block 16, the cohesion of each term is a score, which is determined from the sum of the absolute cosine difference between each document containing the term and the centroid of all documents containing the term. At a block 18, the cohesion scores are normalized by taking into account the size of each term document set. At a block 20, terms are sorted in order of decreasing cohesion score. At a block 22, categories are created iteratively. At a block 24, the resulting categorizations are refined by running one iteration of a k-means algorithm on the set of categories created at block 22. (i.e., a centroid is created for each category and each document is moved to the category of the closest centroid).

The k-means algorithm is a well known algorithm that clusters objects based on attributes into k partitions. It is a variation of the expectation-maximization algorithm that seeks to determine the k means of data generated from gaussian distributions. It assumes that the object attributes form a vector space. It also seeks to achieve is to minimize total intra-cluster variance, or, the function:

$$V = \sum_{i=1}^{k} \sum_{j \in S_i} |x_j - \mu_i|^2$$

where there are k clusters $S_i$, i=1, 2, ..., k and $\mu_i$ is the centroid or mean point of all the points $x_j \in S_i$. The algorithm starts by partitioning the input points into k initial sets, and then calculates the mean point, or centroid, of each set. It constructs a new partition by associating each point with the closest centroid. Then the centroids are recalculated for the new clusters, and algorithm repeated by alternate application of these two steps until convergence.

Figure 2:
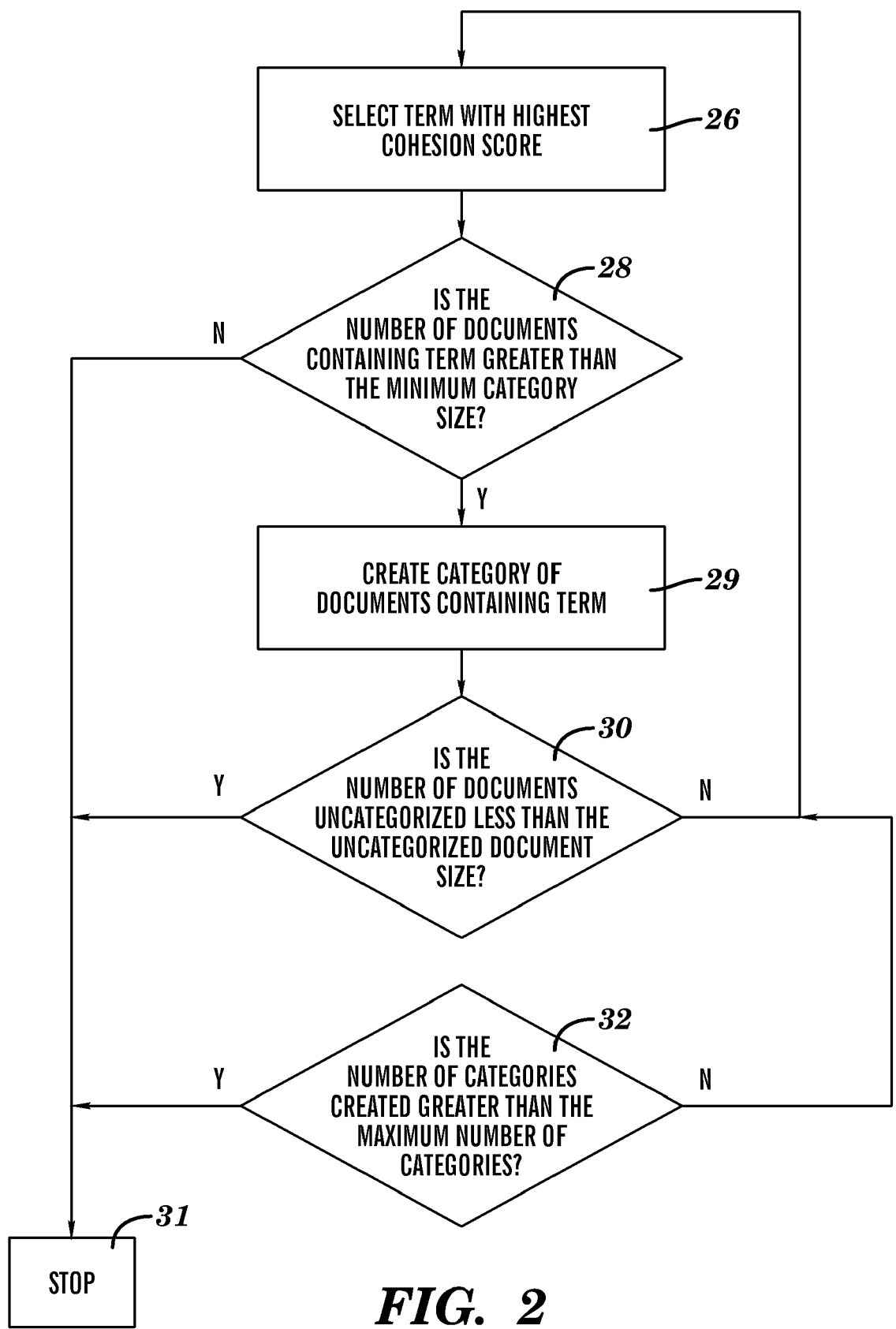
FIG. 2 illustrates one example of a flow chart for creation of the categories iteratively.

Turning also to FIG. 2, the creation of the categories iteratively is illustrated by a flow chart. At a block 26, the most cohesion term in the list not yet used is selected. At a block 28, if the number of uncategorized documents that contain the selected term is greater than the minimum category size, M, then create a category, at a block 29, consisting of all documents that contain this term still uncategorized. Otherwise stop at a block 31. At a block 30, if the number of uncategorized documents remaining is less than U, then STOP (block 31). At a block 32, if the number of categories created is greater than C, then stop (block 31). Repeat these steps until a stop criterion is met or no more dictionary terms remain.

The dictionary, D is identified at block 12 by representing each document as a vector of weighted frequencies of the document features (i.e., words and phrases), and then using a term-weighting scheme. This scheme emphasizes words with high frequency in a document, and normalizes each document vector to have unit Euclidean norm. For example, if a document were the sentence, "We have no bananas, we have no bananas today," and the dictionary consisted of only two terms, "bananas" and "today", then the unnormalized document vector would be {2 1} (i.e., to indicate two bananas and one today), and the normalized version would be:

$$\left[ \frac{2}{\sqrt{5}}, \frac{1}{\sqrt{5}} \right].$$

The words and phrases that make up the document feature space are determined by first counting which words occur most frequently (i.e., in the most documents) in the text. A standard "stop word" list is used to eliminate words such as "and", "but", and "the". The top N words are retained in the first pass, where the value of N may vary depending on the length of the documents, the number of documents and the number of categories to be created. Typically N=2000 is sufficient for 10000 short documents of around 200 words to be divided into 30 categories. After selecting the words in the first pass, a second pass is made to count the frequency of the phrases that occur using these words. A phrase is considered to be a sequence of two words occurring in order with out intervening non-stop words. This is repeated so as to keep only the N most frequent words and phrases. This becomes the feature space. A third pass through the data indexes the documents by their feature occurrences. The user may edit this feature space as desired to improve clustering performance. This includes adding in particular words and phrases the user deems to be important, such as named entities like "International Business Machines". Stemming is usually also incorporated to create a default synonym table that the user may also edit.

The occurrences of dictionary terms are counted at block 14 by creating a Sparse Matrix of word occurrences in documents after the third pass through. This matrix records how often each dictionary term occurs in each document.

The cohesion of each term are defined at block 16 by defining the cosine distance between any two document vectors (i.e., the cosine distance metric) as:

$$\cos(X \cdot Y) = \frac{X \cdot Y}{\|X\| \cdot \|Y\|}$$

The set of documents that match a given term can be represented by a centroid (i.e., average) vector, of all such documents. If the set of documents that match a given term (i.e., the matching set) is defined is represented by, T, then the cohesion of this set is defined to be:

$$\text{cohesion}(T, n) = \frac{\sum_{x \in T} \cos(\text{centroid}(T), x)}{|T|^n}$$

where T is a text data set containing the documents and n is a normalization parameter.

The cohesion scores are normalized at block 18 by taking into account the size of each term document set. The normalization parameter allows the user to compare terms that have different amounts of data. Typically small matching set terms would have an advantage if the normalization parameter, n, were set to 1.0. To adjust for this fact the value of n can be adjusted downward to allow larger matching set terms to be ranked higher if desired. A typical value of n=0.9 is one that seems to work well in many application areas.

The dictionary terms are sorted at block 20 in order of decreasing matching set cohesion. Some terms may be eliminated from this list if the matching set size is deemed to small to get an accurate measure of cohesion.

Categories are created iteratively at block 22. Starting with the first term in cohesion order, create mutually exclusive (single membership) categories. The first category contains all documents that contain the most cohesion term. The second category contains all documents that do not contain the most cohesion term, but do contain the second most cohesion term. The third category contains all documents not in the first two categories that contain the third most cohesion term. This category creation method continues until one of the following stopping criteria is met:

1. The number of uncategorized documents is less than the minimum threshold, U.
2. The number of categories is greater than the maximum threshold, C.
3. No more dictionary terms remain to create categories with.

A lower bound is set on the smallest size of an acceptable category. Thus any term that would create a category of size smaller than this threshold (because most of its documents are already contained in previous categories) is skipped.

The resulting categorizations are refined at block 24 by creating a centroid for each category (i.e., an average document vector of all documents contained in the category). Each document is then moved into the category of the centroid it is "nearest" to, using the cosine distance metric. This membership "adjustment" tends to place those documents that could belong to more than one category in the category that is most representative of their overall content. The purpose of this refinement is to properly position those documents that contain more than one of the cohesion terms used in the category creation phase.

It will be appreciated that some of the cohesion terms may be excluded from consideration as category definitions, because they do not lead to useful categories. The level of granularity may be set (i.e., the number of categories) by adjusting the threshold U (i.e., the number of uncategorized documents) or n (i.e., the normalization for size). Further, an alternative to normalizing for category size is to specify a minimum category size and then sample all categories to that size when calculating both the centroid and the cohesion values.

The k-means clustering described above may create categories that are difficult to interpret by a human being. Typically, cluster-naming approaches attempt to address this issue by adding more and more terms to a name to capture the complex concept that is being modeled by a centroid. Unfortunately, this approach puts the onus on the human interpreter to make sense of what the list of words means and how it relates to the entire set of examples contained in the category. In the present exemplary embodiment, a categorization that is easier to comprehend is to be used. This alternative of putting such documents in more than one category (i.e., multiple membership) is less desirable because it increases the average size of each category and defeats the purpose of summarization via the divide and conquer strategy inherent in a document clustering. Creating multiple copies of documents that match more than one category would be multiplying instead of dividing. Once the clusters are created, they are named with the single term that was used to create each cluster in the first place, thus avoiding the complex name problem associated with k-means clusters. This does not eliminate the need for taxonomy visualization and editing by an analyst, it does however make the process much less cumbersome by creating categories that are (for the most part) fairly easy to comprehend immediately. This is believed to cut the time required to edit each taxonomy by about half (i.e., from around 30 minutes to around 15 minutes per forum).

computer help desk problem tickets. The initial categorization created by our approach is illustrated in Table 1 below.

TABLE 1

| Class Name | Class Size | Percentage |
|---|---|---|
| print | 824 | 12.33% |
| Miscellaneous | 689 | 10.31% |
| install | 394 | 5.89% |
| quick_fix | 376 | 5.63% |
| print_install | 289 | 4.32% |
| note | 254 | 3.80% |
| file | 221 | 3.31% |
| lotus_note | 180 | 2.69% |
| email | 153 | 2.29% |
| customer_install | 122 | 1.83% |
| afs | 118 | 1.77% |
| address_book | 117 | 1.75% |
| adsm | 110 | 1.65% |

TABLE 1-continued

| Class Name | Class Size | Percentage |
|---|---|---|
| note_email | 107 | 1.60% |
| network | 103 | 1.54% |
| print_unable | 102 | 1.53% |
| password | 101 | 1.51% |
| database | 96 | 1.44% |
| email_database | 95 | 1.42% |
| afs_password | 92 | 1.38% |
| connect_network | 88 | 1.32% |
| note_id | 88 | 1.32% |
| drive | 82 | 1.23% |
| server_connection | 78 | 1.17% |
| afs_quota | 74 | 1.11% |
| install_configure | 72 | 1.08% |
| reboot_system | 70 | 1.05% |
| calendar | 68 | 1.02% |
| personal_address | 64 | 0.96% |
| ip_address | 63 | 0.94% |
| netscape | 63 | 0.94% |
| data_directory | 62 | 0.93% |
| calendar_profile | 61 | 0.91% |
| forward_email | 60 | 0.90% |
| location_document | 59 | 0.88% |
| configure | 56 | 0.84% |
| email_template | 54 | 0.81% |
| email_server | 54 | 0.81% |
| send_email | 53 | 0.79% |
| reset | 52 | 0.78% |
| card | 50 | 0.75% |
| command_line | 44 | 0.66% |
| reset_afs | 41 | 0.61% |
| home_page | 41 | 0.61% |
| hard | 40 | 0.60% |
| id | 38 | 0.57% |
| afs_userid | 38 | 0.57% |
| softdist | 35 | 0.52% |
| internet_email | 34 | 0.51% |
| proxy | 33 | 0.49% |
| vm_session | 32 | 0.48% |
| driver | 32 | 0.48% |
| ring | 30 | 0.45% |
| file_system | 30 | 0.45% |
| netdoor | 28 | 0.42% |
| template | 27 | 0.40% |
| lan | 27 | 0.40% |
| monitor | 27 | 0.40% |
| admin | 25 | 0.37% |
| copy_file | 24 | 0.36% |
| socks | 24 | 0.36% |
| swap | 23 | 0.34% |
| mouse | 19 | 0.28% |
| www | 19 | 0.28% |
| think_pad | 18 | 0.27% |
| modem | 18 | 0.27% |
| apps | 15 | 0.22% |
| serial_number | 8 | 0.12% |
| Total | 6684.0 | 100.00% |

The "Miscellaneous" category includes all of the uncategorized documents from the algorithm. These are those documents that did not match any of the cohesion terms before the stopping criteria were met.

Figure 3:
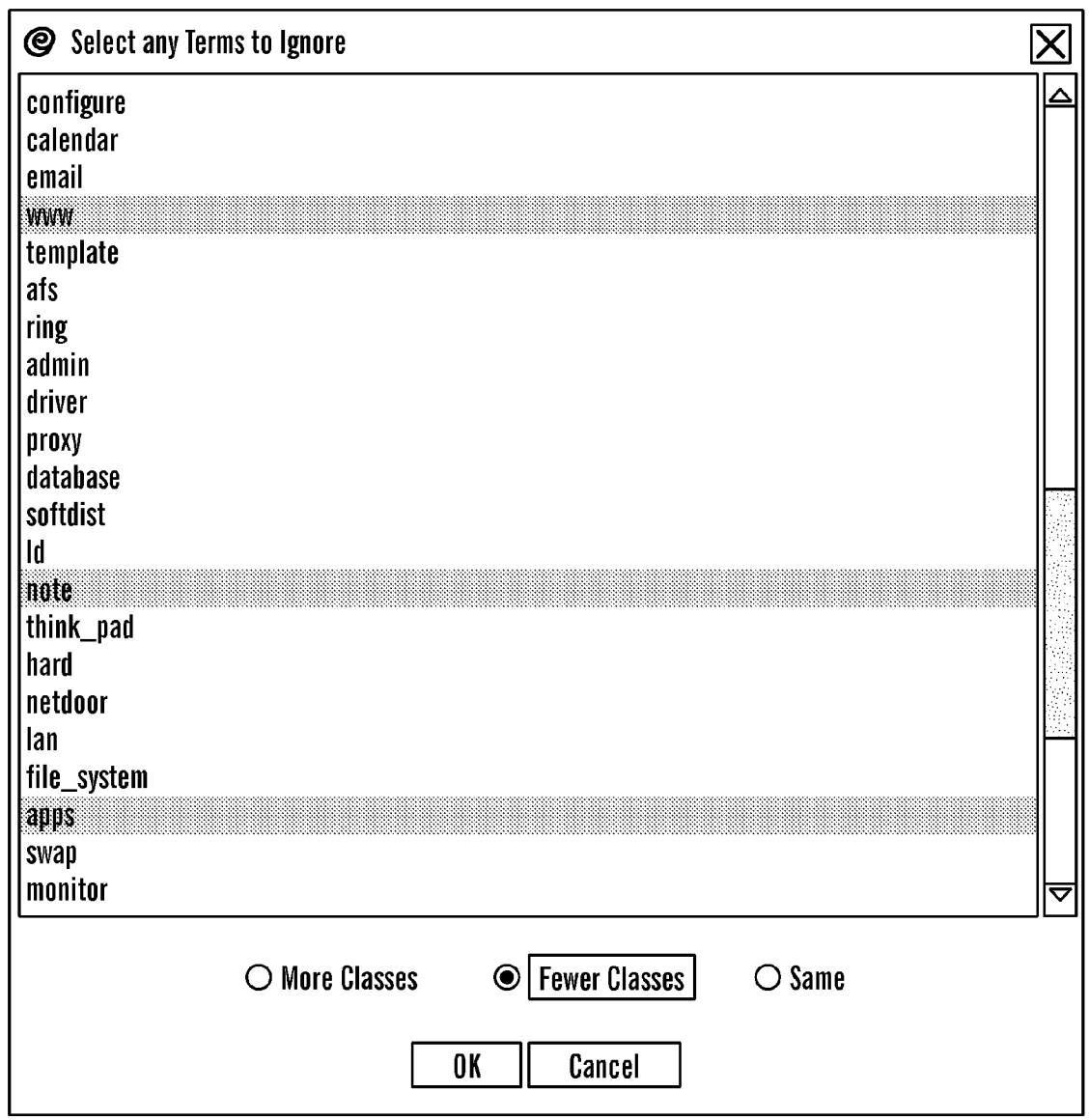
FIG. 3 illustrates one example of a user interface for the cohesion term taxonomy.

In the next step the user selects any categories that are not suitable and also requests that fewer overall categories be created. Turning to FIG. 3, the user interface for this interaction is illustrated.

The selected terms are removed from consideration as possible cohesion terms. Further the n parameter is decreased from the default of "0.9" to a lower "0.85" thus giving a greater advantage in the selection process to more frequent terms. The result of applying these changes and rerunning the algorithm is illustrated in Table 2 below.

TABLE 2

| Class Name | Class Size | Percentage |
|---|---|---|
| Miscellaneous | 1027 | 15.37% |
| print | 862 | 12.90% |
| install | 449 | 6.72% |
| quick_fix | 414 | 6.19% |
| email | 389 | 5.82% |
| print_install | 295 | 4.41% |
| file | 270 | 4.04% |
| server | 225 | 3.37% |
| lotus | 216 | 3.23% |
| address_book | 190 | 2.84% |
| afs_password | 127 | 1.90% |
| customer_install | 121 | 1.81% |
| id | 114 | 1.71% |
| email_database | 112 | 1.68% |
| network | 111 | 1.66% |
| password | 107 | 1.60% |
| afs | 104 | 1.56% |
| database | 99 | 1.48% |
| adsm | 95 | 1.42% |
| connect_network | 90 | 1.35% |
| data_directory | 81 | 1.21% |
| quota_increase | 75 | 1.12% |
| hard_drive | 74 | 1.11% |
| server_connection | 73 | 1.09% |
| install_configure | 69 | 1.03% |
| calendar | 69 | 1.03% |
| configure | 63 | 0.94% |
| calendar_profile | 60 | 0.90% |
| ip_address | 60 | 0.90% |
| email_template | 58 | 0.87% |
| location_document | 54 | 0.81% |
| reset | 53 | 0.79% |
| file_open | 50 | 0.75% |
| afs_account | 42 | 0.63% |
| template | 39 | 0.58% |
| driver | 38 | 0.57% |
| vm_session | 35 | 0.52% |
| dialer | 34 | 0.51% |
| common | 33 | 0.49% |
| network_connection | 32 | 0.48% |
| softdist | 32 | 0.48% |
| ring | 28 | 0.42% |
| tcp_ip | 27 | 0.40% |
| respond | 24 | 0.36% |
| certificate | 23 | 0.34% |
| home_page | 23 | 0.34% |
| request_afs | 18 | 0.27% |
| Total | 6684.0 | 100.00% |

The user's request for "fewer classes" requires an adjustment to the allowable size of the uncategorized documents (i.e., the Miscellaneous category) to increase from 10% to 15%. This adjustment in conjunction with the smaller n parameter tends to create a higher level (i.e., more general) set of categories that are more in line with what the user desires. Another iteration, decreasing the normalization parameter to 0.8 and allowing the size of the miscellaneous class to grow to 20% creates the taxonomy shown in Table 3 below.

TABLE 3

| Class Name | Class Size | Percentage |
|---|---|---|
| Miscellaneous | 1395 | 20.87% |
| print | 890 | 13.32% |
| email | 568 | 8.50% |
| note | 481 | 7.20% |
| install | 479 | 7.17% |
| quick_fix | 452 | 6.76% |
| print_install | 298 | 4.46% |
| server | 283 | 4.23% |
| lotus_note | 269 | 4.02% |
| address_book | 181 | 2.71% |
| afs | 163 | 2.44% |
| password | 150 | 2.24% |
| password_reset | 148 | 2.21% |
| connect_network | 127 | 1.90% |
| database | 115 | 1.72% |
| customer_install | 100 | 1.50% |
| address | 91 | 1.36% |
| configure | 80 | 1.20% |
| adsm | 78 | 1.17% |
| quota_increase | 75 | 1.12% |
| install_configure | 73 | 1.09% |
| reset | 64 | 0.96% |
| request_customer | 58 | 0.87% |
| vos | 39 | 0.58% |
| register_adsm | 27 | 0.40% |
| Total | 6684.0 | 100.00% |

After each iteration of the algorithm the categories become somewhat more general, while still retaining much the same flavor.

Implementation as a computer program, written in the Java programming language and executed with the Java virtual machine is illustrated in the Example below, and includes actual Java code along with explanatory annotations.

Example

```
public class IntuitiveClustering extends TextClustering
implements ActionListener {
    float wcohesion[ ] = null;
    String tempName = null;
    public float granularity = 0.9F;
    public HashSet badTerms = new HashSet( );
    TextClustering tc = null;
    public transient JDialog jd = null;
    transient JRadioButton more = new JRadioButton(Translate.simpleText("More
Classes"));
    transient JRadioButton less = new JRadioButton(Translate.simpleText("Fewer
Classes"));
    transient JRadioButton same = new JRadioButton(Translate.simpleText("Same"),true);
    transient JList values = null;
    transient JButton Done,Cancel;
    public boolean ok = true;
    public IntuitiveClustering(TextClustering t) {
        super( );
        tc = t;
        if (!Util.getParameter("granularity").equals(" "))
            granularity = Util.atof(Util.getParameter("granularity"));
```

```
}
public void update(float g, String a[ ]) {
    for (int i=0; i<a.length; i++) badTerms.add(a[i]);
    granularity = g;
    wcohesion = null;
    run( );
}
public void promptForUpdate(Frame f, String title) {
    jd = new JDialog(f,true);
    JPanel buttons = new JPanel( );
    buttons.setLayout(new FlowLayout( ));
    if (clusterNames==null) clusterNames = tc.clusterNames;
    values = new com.ibm.nls.JList(clusterNames);
    JScrollPane jp = new JScrollPane(values);
    jp.setPreferredSize(newDimension(500,400));
    Done = new JButton("OK");
    Cancel = new JButton("Cancel");
    Done.addActionListener(this);
    Cancel.addActionListener(this);
    buttons.add(Done);
    buttons.add(Cancel);
    ButtonGroup bg = new ButtonGroup( );
    bg.add(more);
    bg.add(less);
    bg.add(same);
    FlowLayout fl = new FlowLayout( );
    fl.setHgap(15);
    JPanel jp2 = new JPanel(fl);
    jp2.add(more);
    jp2.add(less);
    jp2.add(same);
    jd.setTitle(title);
    jd.getContentPane( ).setLayout(new BorderLayout(10,10));
    jd.getContentPane( ).add("North",jp);
    jd.getContentPane( ).add("Center",jp2);
    jd.getContentPane( ).add("South",buttons);
    jd.pack( );
    jd.show( );
}
public void actionPerformed(ActionEvent evt) {
    if (Done==evt.getSource( )) {
        if (more.isSelected( )) granularity = granularity + 0.05F;
        if (less.isSelected( )) granularity = granularity – 0.05F;
        int v[ ] = values.getSelectedIndices( );
        for (int i=0; i<v.length; i++) {
            badTerms.add(clusterNames[v[i]]);
            if (Util.getParameter("append").equals("yes")) {
                try {
                    PrintWriter pw = Util.openAppendFile("stop Words.txt");
                    pw.println(clusterNames[v[i]]);
                    pw.close( );
                } catch (Exception e) { };
            }
        }
        ok = true;
        jd.dispose( );
    }
    if (Cancel==evt.getSource( )) {
        ok = false;
        jd.dispose( );
    }
}
public void run( ) {
    System.out.println("granularity = " + granularity);
    float ff[ ] = ClusterView.getDataMeans(tc);
    float f[ ] = wordCohesion(tc,ff);
    int order[ ] = Index.run(f);
    int membership[ ] = new int[tc.ndata];
    for (int i=0; i<tc.ndata; i++) membership[i] = −1;
    order = Util.reverse(order);
    StringVector sv = new StringVector( );
    HashSet h = new HashSet( );
    for (int i=0; i<order.length; i++) {
        if (badTerms.contains(tc.attribNames[order[i]])) {
            System.out.println("bad term: " + tc.attribNames[order[i]]);
            continue;
        }
        StringVector subterms = new StringVector(tc.attribNames[order[i]],"_");
        if (badTerms.contains(subterms.myElementAt(0))) continue;
        if (subterms.size( )>1 && badTerms.contains(subterms.myElementAt(1)))
```

-continued

```
continue;
                float matches = 0.0F;
                if (f[order[i]]==0) break;
                MyIntVector docs = getMatches(order[i], tc);
                for (int j=0; j<docs.size( ); j++)
                    if (h.contains(docs.elementAt(j)))
                        matches++;
                if (matches/docs.size( )>=0.9F) ;
                    // System.out.println("eliminating " + tc.attribNames[order[i]] + " as a duplicate");
                else {
                    int count = 0;
                    for (int j=0; j<docs.size( ); j++)
                        if (!h.contains(docs.elementAt(j)))
                            count++;
                    if ((tc.ndata-h.size( ))/100.0>count) continue; //min size of class is 1% of remaining data
                    if (count<3) continue;
                    for (int j=0; j<docs.size( ); j++) {
                        if (!h.contains(docs.elementAt(j))) {
                            h.add(docs.elementAt(j));
                            membership[docs.myElementAt(j)] = sv.size( );
                        }
                    }
                    sv.addElement(tc.attribNames[order[i]]);
                }
                //System.out.println("h.size( ) = " + h.size( ));
                if (h.size( )>tc.ndata*Math.min(granularity,0.95)) {
                    System.out.println("breaking because granularity = " + granularity);
                    break;
                }
                if (sv.size( )==200) break;
            }
            for (int i=0; i<tc.ndata; i++)
                if (membership[i]==-1) membership[i] = sv.size( );
            sv.addElement("Miscellaneous");
            clusterNames = sv.getStringArray( );
            nclusters = clusterNames.length;
            input_length = tc.input_length;
            ndata = tc.ndata;
            example = tc.example;
            attribNames = tc.attribNames;
            pointNumber = tc.pointNumber;
            computeMembership(membership);
            classify( );
            //mergePhraseSimilar( );
            //classify( );
            //refine clustering with one step of KMeans
            moveToNearestCentroid( );
        }
        public void moveToNearestCentroid( ) {
            TextClustering tc = this;
            float ss[ ] = new float[tc.nclusters];
            for (int i=0; i<ss.length; i++)
                ss[i] = (float)Math.sqrt(Util.dotProduct(tc.centroids[i],tc.centroids[i]));
            short nextMembership[ ] = new short[tc.ndata];
            for (int i=0; i<tc.ndata; i++) {
                SmallMatrixRow smr = ClusterManipulation.getSmallRow(tc.example,i);
                int c = AccuracyMetric.getNearestCluster(tc,smr,ss);
                if (tc.clusterNames[tc.smembership[i]].equals(EAdvisor.miscClassName))
                    nextMembership[i] = tc.smembership[i];
                else
                    nextMembership[i] = (short)c;
            }
            tc.computeMembership(nextMembership);
            tc.classify( );
        }
        public float[ ] wordCohesion(TextClustering tc, float overallRelev[ ]) {
            float result[ ] = new float[tc.attribNames.length];
            for (int i=0; i<result.length; i++) {
                MyIntVector docs = getMatches(i, tc);
                result[i] = getAvgDistance(tc,docs.makeArray( ));
            }
            wcohesion = result;
            return(result);
        }
        public MyIntVector getMatches(int a, TextClustering k) {
            MyIntVector result = new MyIntVector( );
            SmallSparseMatrix ssm = (SmallSparseMatrix)k.example;
            for (int i=0; i<k.ndata; i++) {
```

```
            SmallMatrixRow smr = ssm.getSmallRow(i);
            for (int j=0; j<smr.positions.length; j++) {
                if (smr.positions[j]==a) {
                    result.addElement(i);
                    break;
                }
            }
        }
        return(result);
    }
    public float getAvgDistance(KMeans tc, int textDocuments[ ]) {
        if (textDocuments.length==0) return(0.0F);
        float result = 0.0F;
        float centroid[ ] = Util.emptyFloat(tc.input_length);
        for (int i=0; i<textDocuments.length; i++) {
            SmallMatrixRow           smr           =
ClusterManipulation.getSmallRow(tc.example,textDocuments[i]);
            for (int j=0; j<smr.positions.length; j++) {
                if (smr.positions[j] > -1) {
                    centroid[smr.positions[j]]+= smr.multiplier;
                }
            }
        }
        float ss = (float)Math.sqrt(Util.dotProduct(centroid,centroid));
        for (int i=0; i<textDocuments.length; i++)
            result+=
Math.abs(SmallSparseMatrix.cosDistance(ClusterManipulation.getSmallRow(tc.example,
textDocuments[i]), centroid, ss));
        float size = (float)Math.pow(textDocuments.length,granularity);
        return(result/size);
    }
}
```

The capabilities of the present invention can be implemented in software, firmware, hardware or some combination thereof.

As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A program storage device encoded with machine-readable computer program code for document categorization, the storage device including instructions for causing a computer to implement a method comprising:

identifying with the computer terms occurring in a collection of documents;

determining a cohesion score for each of the terms, the cohesion score is a function of a cosine difference between each of the documents containing the term and a centroid of all the documents containing the term;

sorting the terms based on the cohesion scores;

creating categories based on the cohesion scores of the terms, wherein each of the categories includes only documents (i) containing a selected one of the terms and (ii) that have not already been assigned to a category; and moving each of the documents to a category of a nearest centroid, thereby refining the categories;

wherein creating the categories, comprises:

(a) selecting the term with the highest of the cohesion scores that has not been selected;

(b) if a number of the documents that are uncategorized contain the term selected as having the highest of the cohesion scores is greater than a minimum category size, creating another category consisting of all documents that contain the term selected as having the highest of the cohesion scores when the number of documents that are uncategorized contain the term selected as having the highest of the cohesion scores is greater than a minimum category size;

(c) ceasing creating the categories when the number of the documents that are uncategorized is less than an uncategorized document size or when the number of the other categories created is greater than a maximum number of categories; and (d) repeating steps (a)-(c) until step (c) is performed or none of the terms remain when, at least one of, (i) the number of the documents that are uncategorized is not less than the uncategorized document size and (ii) the number of the other categories created is not greater than maximum number of categories.

2. The storage device of claim 1, wherein the method further comprises:

normalizing the cohesion scores.

3. The storage device of claim 1, wherein the method further comprises:
 re-categorizing any of the documents belonging to more than one the categories.

4. The storage device of claim 1, wherein the sorting the terms comprises sorting the terms in a decreasing order of the cohesion scores.

5. The storage device of claim 1, wherein the identifying the terms, comprises:
 identifying the terms from a dictionary by, representing each of the documents as a vector of weighted frequencies of the terms, and
 using a term-weighting scheme to emphasizes the terms with a high frequency in the document, and
 normalizing each the vectors to have a unit Euclidean norm.

6. The storage device of claim 1, wherein the cohesion score is given by:

$$\text{cohesion}(T, n) = \frac{\sum_{x \in T} \cos(\text{centroid}(T), x)}{|T|^n}$$

where T is the documents and n is a normalization parameter.

* * * * *